United States Patent [19]

Le Marchand et al.

[11] Patent Number: 4,915,462
[45] Date of Patent: Apr. 10, 1990

[54] SHOCK-RESISTANT WIRE-MESH TROLLEY FOR TRANSPORTING VARIOUS PRODUCTS

[75] Inventors: Alain Le Marchand, Reichstett; Raymond Gillot, Bischheim, both of France

[73] Assignee: Ateliers Reunis Caddie, Schiltigheim, France

[21] Appl. No.: 281,454

[22] Filed: Dec. 8, 1988

[30] Foreign Application Priority Data

Dec. 9, 1987 [FR] France .................. 87 17132

[51] Int. Cl.⁴ .............................................. A47B 47/03
[52] U.S. Cl. .................... 312/250; 211/181; 220/19
[58] Field of Search ............... 312/210, 250, 252 SK; 220/19; 211/181

[56] References Cited

U.S. PATENT DOCUMENTS

| | | | |
|---|---|---|---|
| 2,981,440 | 4/1961 | Lilja | 220/19 X |
| 3,315,835 | 4/1967 | Katzman | 220/19 X |
| 3,834,549 | 9/1974 | Burg et al. | 211/182 |
| 3,977,529 | 8/1976 | Stroh | 311/181 X |
| 4,509,805 | 4/1985 | Welsch et al. | 312/250 X |
| 4,632,473 | 12/1986 | Smith | 312/257 SK |

FOREIGN PATENT DOCUMENTS 2189304  1/1974  France .
WO83/02881  9/1983  PCT Int'l Appl. .

Primary Examiner—Joseph Falk
Attorney, Agent, or Firm—Young & Thompson

[57] ABSTRACT

A trolley for transporting various products has two lateral walls each constituted by a grid formed by intercrossed wires, the lower ends of the lateral walls being fixed on two opposite sides of a horizontal platform mounted on casters. The two lateral walls are given the shape of an inverted L and the edges of their horizontal top wings are juxtaposed and rigidly assembled together by means of bolts, for example. In addition, the feet of the uprights of the two lateral walls are rigidly fixed within vertical sleeves provided at the four corners of the bottom platform of the trolley. Thus the lateral walls form with the platform a very rigid cage which is capable of withstanding repeated shocks without being damaged.

6 Claims, 3 Drawing Sheets

FIG. I

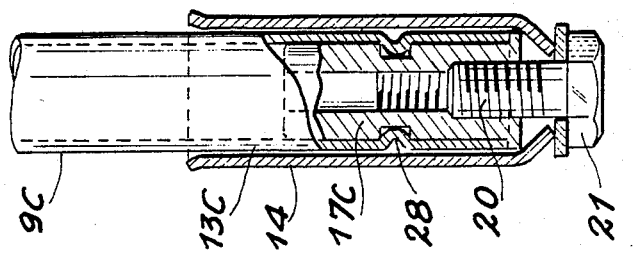
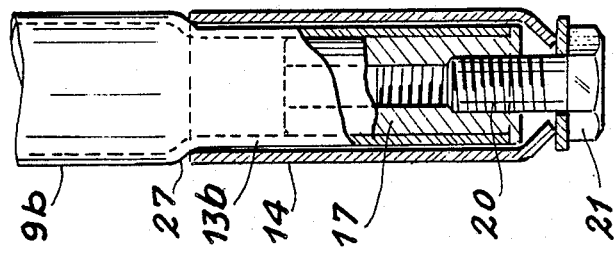
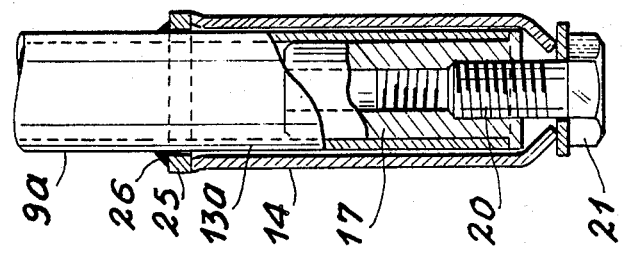
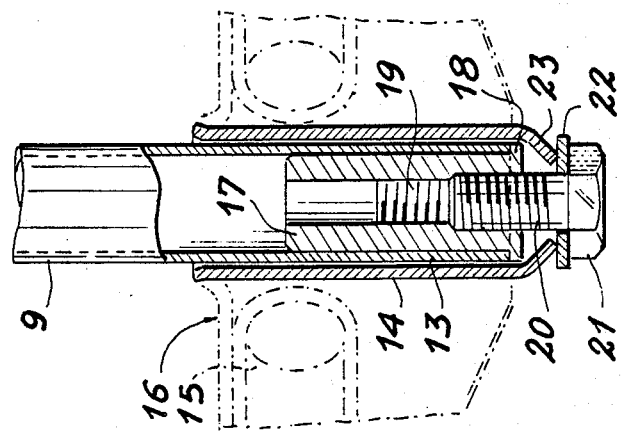

SHOCK-RESISTANT WIRE-MESH TROLLEY FOR TRANSPORTING VARIOUS PRODUCTS

BACKGROUND OF THE INVENTION

1. Field of the Invention

The present invention relates to a trolley which is intended to transport various products and has two lateral walls each constituted by a grid formed by intercrossed wires, the lower ends of said lateral walls being fixed on two opposite sides of a horizontal platform mounted on casters. In addition, the front and rear faces of these trolleys are usually closed by detachable panels. However, provision can also be made for a fixed rear wall and a front door hinged on the upright member of one of the lateral walls.

2. Description of the Prior Art

Trolleys of this type are employed for numerous applications, for example for transporting merchandise in order to restock a retail store. In such instances, trolleys are usually provided at the top with a closure lid. However, since these trolleys also have side walls as well as front or rear closure elements fitted in the base, the entire cage thus formed is subjected to a considerable number of impacts during transportation in trucks. An extremely frequent occurrence in such cases is that the side walls acquire additional play at the point of attachment to the bottom platform, thus resulting in considerable deformation of the entire assembly. It also happens that, as a result of handling operations during transportation, the cage which has thus been deformed is then dislodged from the bottom platform.

Trolleys of this type can also be employed for transportation and storage of butchery products such as pre-cut pieces of meat. In such a case, these trolleys can be provided with movable shelves. Here again, however, the same disadvantages as those mentioned earlier are encountered. The same applies to all the other customary uses of such trolleys, especially when these latter are employed for transporting linen or the like between customers' premises and a laundry.

It is for this reason that the aim of the present invention is to provide a structural design such that a trolley of the type considered is endowed with very high strength and is thus capable of sustaining without damage the impacts which are inevitable during transport operations. Moreover, the design concept of this trolley dispenses with any need to provide a separately mounted lid for closing the top end of the trolley.

SUMMARY OF THE INVENTION

To this end, the trolley in accordance with the invention is distinguished by the fact that the two lateral walls of the trolley are given the general shape of an inverted L and the edges of their horizontal top wings are juxtaposed and rigidly assembled together by means of bolts, for example, the feet of the uprights of said two lateral walls being also rigidly fixed in vertical sleeves provided at the four corners of the bottom platform of the trolley.

Thus the two lateral walls form with the bottom platform a perfectly rigid cage which is capable of withstanding repeated impacts without being damaged. Moreover, said cage is closed at its upper end, thus avoiding the need to mount a separate lid at the top. The assembly thus constituted with the platform forms a single-unit construction which prevents any play at the upper end or lower end and guards against any danger of deformation of this structure.

In accordance with another distinctive feature of the trolley under consideration, rigid attachment of the foot of each upright of the lateral walls is ensured by means of an end-piece which is mounted separately within said foot and is provided with an internally-threaded axial bore for receiving an assembly bolt, the head of said bolt being applied against the lower end of the corresponding vertical sleeve carried by the bottom platform of the trolley.

BRIEF DESCRIPTION OF THE DRAWINGS

FIG. 4 is a fragmentary sectional view taken along line IV—IV of FIG. 3.

FIGS. 5 to 7 views which are similar to FIG. 4 but illustrate alternative forms of construction.

DESCRIPTION OF THE PREFERRED EMBODIMENTS

Figure 1:
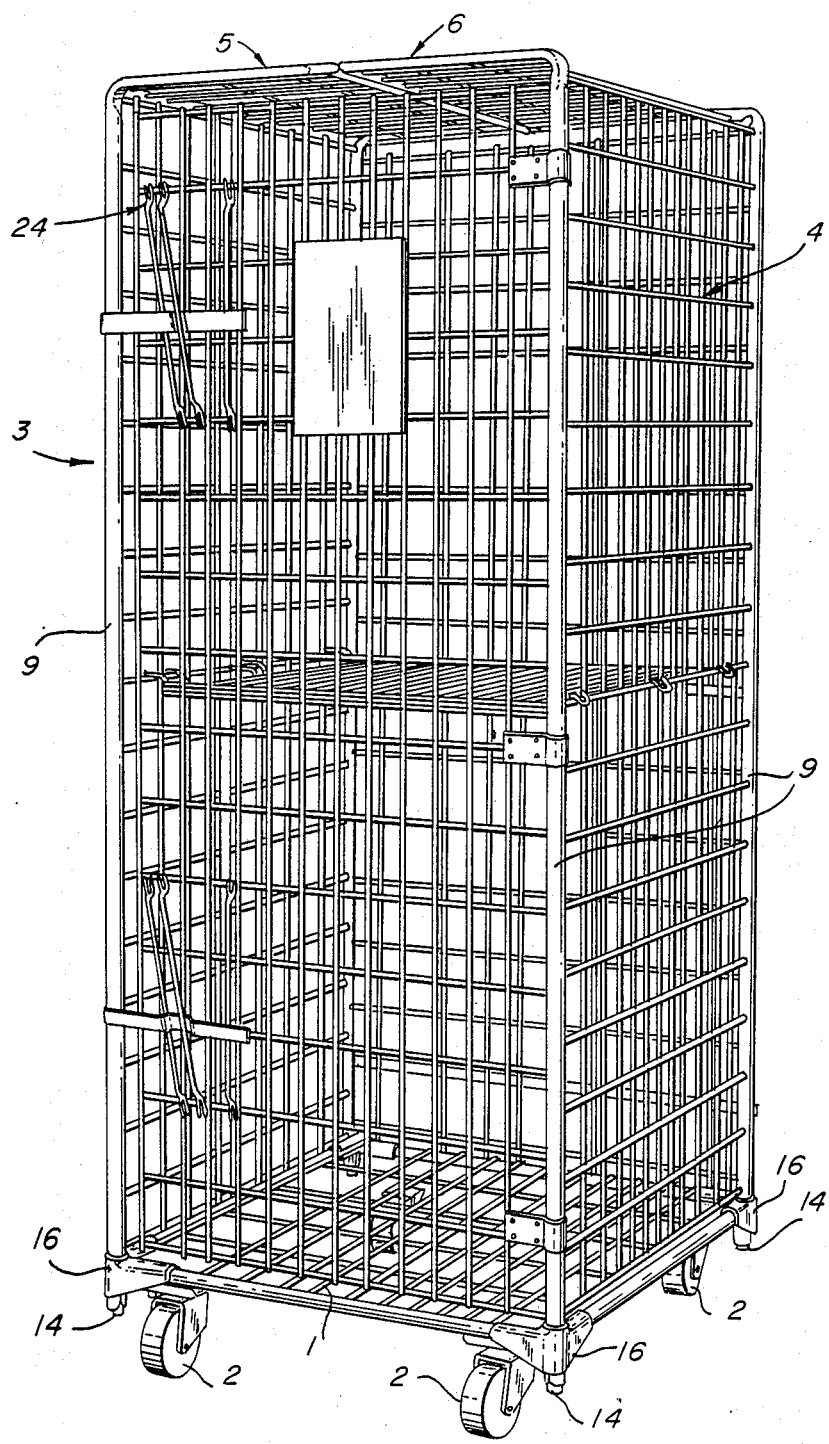
FIG. 1 is a view in perspective of a trolley in accordance with the invention.
Figure 2:
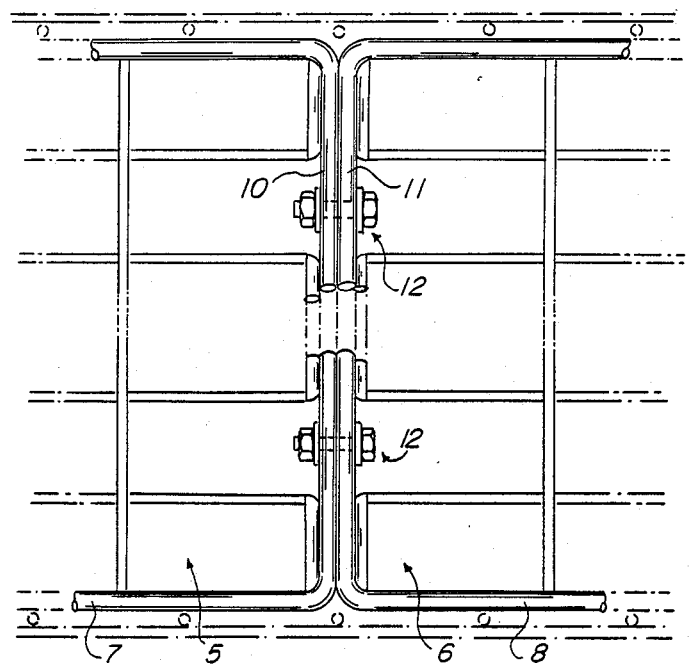
FIG. 2 is a fragmentary overhead plan view of the top end of said trolley.

The trolley shown in FIG. 1 has a bottom platform 1 mounted on casters 2. Above two opposite sides of said platform, provision is made for two vertical lateral walls 3 and 4. In accordance with the main distinctive feature of the object of the invention, each of these walls is given the general shape of an inverted L. In consequence, the vertical portion of each wall has an upper extension in the form of a top wing 5 or 6 which extends in the horizontal direction. The two horizontal wings thus provided extend towards each other and are directly secured to each other, for example by means of bolts.

Each lateral wall 3 or 4 is constituted by a grid which is formed by intercrossed wires and is surrounded by a frame of metallic tubing. A single tube 7 or 8 which is suitably elbowed forms the frame of each lateral wall. The vertical arms of said tube constitute the vertical uprights 9 of the corresponding wall.

In consequence, the horizontal top wings 5 and 6 are secured to the lateral walls by direct bolting of the corresponding sides 10 and 11 of the two frames 7 and 8, said sides being juxtaposed. This bolting operation can be performed by means of a series of bolts 12. However, direct attachment of the free edges of the top horizontal wings 5 or 6 of the two lateral walls 3 and 4 could be carried out by any other suitable means.

Figure 3:
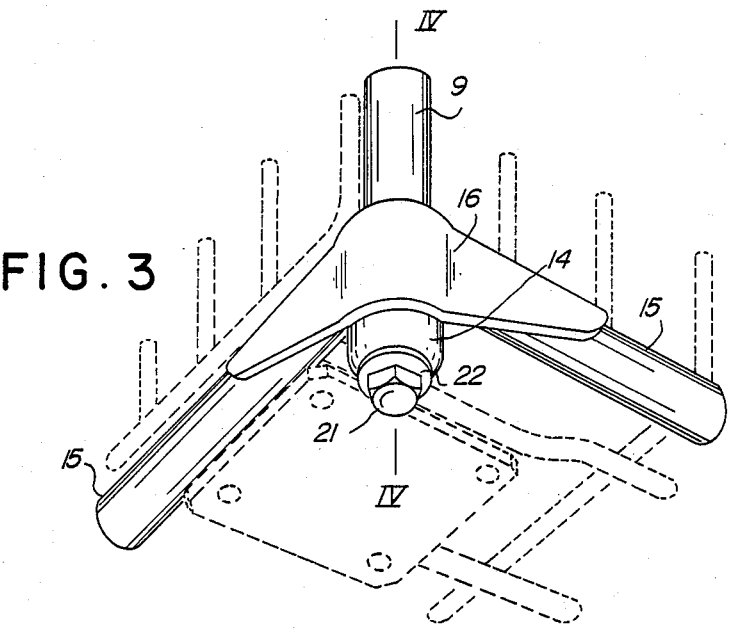
FIG. 3 is a fragmentary view in perspective of one of the sides of the bottom platform.

At its lower end, the foot 13 of each upright 19 of the two lateral walls 3 and 4 is engaged within a vertical sleeve 14 carried by the bottom platform 1 at the corresponding corner. Each sleeve is secured to the sides 15 of the bottom platform by means of a metal gusset-plate 16 which is welded to these different elements (as shown in FIG. 3).

Moreover, coupling of the foot 13 of each upright with the corresponding sleeve 14 is carried out by means of a metallic end-piece 17 which is mounted separately within the end portion of the corresponding upright. This end-piece has a bottom annular flange 18 which is rigidly fixed by welding to the lower end of the respective upright. Moreover, the end-piece 17 has an internally-threaded axial bore 19 within which is screwed a bolt 20, the head 21 of which is applied by means of a washer 22 against the lower end 23 of the sleeve 24, this end being preferably swaged.

The bolt 20 thus provided therefore performs the same function as the adjusting screws used for assembling the components of certain types of furniture. The result thereby achieved is a tight-fitting assembly of the lower end of each upright 9 within the corresponding reception sleeve 14, the internal cross-section of said sleeve being equal to or very slightly larger than the external cross-section of the foot 13 of an upright. In view of the fact that, in addition, the upper ends of the two lateral walls 3 and 4 are directly secured to each other by means of their top wings 5 and 6, there is thus obtained a perfectly rigid cage constituted by the bottom platform and the two lateral walls of the trolley. Under these conditions, the lateral walls are not liable to swing to and from during operations involving transportation and handling of the trolley. Moreover, the walls of said trolley are thus capable of withstanding repeated shocks without resulting in deformation of their walls or in play in the assembly zones. In consequence, this carriage can be used for applications involving numerous handling and transport operations with other similar trolleys within a truck or other means of transport.

Precisely by virtue of the rigidity of the cage formed by the lateral walls 3 and 4, the front and rear faces of the trolley under consideration can both be open so as to receive detachable closure panels after filling of the trolley. However, provision can also be made at the rear for a fixed vertical wall and at the front for a detachable closure panel 24 as is the case in the example shown in FIG. 1. It is apparent that, instead of a detachable panel, it would also be possible to provide a door which is permanently hinged on the front upright of one of the lateral walls.

FIGS. 5 to 7 illustrate alternative embodiments of the mode of coupling of the feet of the vertical uprights of the lateral walls with the reception sleeves carried by the bottom platform of the trolley.

In the case illustrated in FIG. 5, the foot 13a of the corresponding upright 9a is fixed, as before, by means of an end-piece 17 within which is screwed a clamping bolt 20. However, the foot of the upright 9a is also provided with an added ring 25 which is fixed on the foot by means of a weld fillet 26. This ring is so arranged as to bear on the upper end of the reception sleeve 14 carried by the bottom platform of the trolley.

The case illustrated in FIG. 6 differs from the preceding case solely in the fact that the top bearing ring 25 is virtually replaced by an annular shoulder 27 formed at the desired level on the upper portion of the foot 13b of the corresponding upright 9b.

Finally, the case illustrated in FIG. 7 differs from the mode of assembly shown in FIG. 4 solely in the fact that the corresponding assembly end-piece 17c is no longer fixed by welding on the lower end of the respective upright 9c. In fact, in the case considered, these two elements are coupled together by means of a crimp 28 in the foot 13c of said upright within a groove formed for this purpose around the end-piece 17c.

In all these cases, there is obtained a tight rigid coupling of the lower end of the upright considered with the sleeve for receiving this latter. However, many other solutions could be adopted in order to obtain a tight rigid coupling of this type.

As has already been mentioned, the trolley in accordance with the invention can be employed for a large number of applications and, generally speaking, for transportation of merchandise and various products, especially when this transportation involves the need to place a trolley of this type with other similar trolleys within a road truck or railroad freight car in order to be subsequently unloaded and displaced by rolling on the ground.

What is claimed is:

1. Trolley for transporting miscellaneous products, which comprises a horizontal platform mounted on casters and a pair of vertical walls each comprising a grid of intercrossed metal wire, said walls having lower ends secured to two opposed sides of said horizontal platform,
    said pair of vertical walls (3, 4) each having a substantially inveted-L configuration, whereby said walls comrpise top horizontal wings (5, 6) extending toward each other and having edges (10, 11) joined to each other,
    said pair of vertical walls further comprising side uprights (9, 9a, 9b, 9c) having lower ends (13, 13a, 13b, 13c) secured in vertical sleeves (14) secured in turn at four corners of said horizontal platform (1).

2. A trolley as claimed in claim 1, in which said edges (10, 11) are joined by means of bolts.

3. A trolley as claimed in claim 1, in which said lower ends are secured ins aid vertical sleeves by means of assembling gussets (16).

4. A trolley as claimed in claim 1, in which said lower end of each said upright enclosed a socket (17, 17c) secured to the associated said end, said socket having internal threads engaged by a fastening bolt (20) having a head (21) bearing against a lower end of the corresponding vertical sleeve (14).

5. A trolley as claimed in claim 1, in which said lower end of each said upright carries a ring which bears on an upper end of the corresponding said vertical sleeve.

6. A trolley as claimed in claim 1, in which said lower end of each said upright has an annular shoulder which bears on an upper end of the corresponding said vertical sleeve.

* * * * *